United States Patent [19]
Steinle et al.

[11] Patent Number: 5,528,953
[45] Date of Patent: Jun. 25, 1996

[54] AUTOMATIC GEAR SHIFT LEVER ARRANGEMENT

[75] Inventors: Gerhard Steinle, Newport Beach, Calif.; Harald Leschke, Sindelfingen, Germany

[73] Assignee: Mercedes-Benz AG, Germany

[21] Appl. No.: 377,722

[22] Filed: Jan. 24, 1995

[51] Int. Cl.⁶ .................................................. B60K 20/00
[52] U.S. Cl. ........................... 74/473 R; 74/475; 74/335; 477/99
[58] Field of Search ........................... 477/99; 74/473 R, 74/475, 335; 340/456

[56] References Cited

U.S. PATENT DOCUMENTS

| | | | |
|---|---|---|---|
| 2,736,003 | 2/1956 | Hastings | 340/456 |
| 3,231,857 | 1/1966 | Miller | 340/456 |
| 3,326,315 | 6/1967 | Richards. | |
| 3,844,180 | 10/1974 | Williams et al. | 74/473 R |
| 3,901,097 | 8/1975 | Williams et al.. | |
| 3,979,967 | 9/1976 | Dunlap | 74/475 |
| 5,156,243 | 10/1992 | Aoki et al. | 74/335 X |
| 5,161,422 | 11/1992 | Suman et al.. | |
| 5,211,078 | 5/1993 | McCarthy et al.. | |

FOREIGN PATENT DOCUMENTS 4314792  12/1994  Germany.

OTHER PUBLICATIONS

Search Report from French Patent Office dated Sep. 1, 1995.
British Search Report dated Mar. 1, 1995.
Journal "Auto, Motor und Sport," No. 20, 24 Sep. 1993, pp. 139–141.

Primary Examiner—Charles A. Marmor
Assistant Examiner—Peter Kwon
Attorney, Agent, or Firm—Evenson, McKeown, Edwards & Lenahan

[57] ABSTRACT

A selector device of an automatic gear-changing appliance of a gearbox of a motor vehicle is actuated by a withdrawal combined key unit into the positions P, R, N and D. The combined key unit can be withdrawn only in the P position so that an on-board voltage source is positively blocked relative to electrical consumption units.

2 Claims, 4 Drawing Sheets

AUTOMATIC GEAR SHIFT LEVER ARRANGEMENT

BACKGROUND AND SUMMARY OF THE INVENTION

The invention relates to a selector for an automatic gear-changing device of a motor vehicle.

A known selector device of this generic type, for a two-speed automatic gearbox of a motor vehicle driven by an electric motor (with or without support by a gas turbine) is disclosed in the Journal "Auto, Motor und Sport", No. 20, 24 September 1993, Pages 139 and 141. In this device, the usual automatic gearbox selector lever is replaced by a rotary switch which can be actuated manually into four significant angular positions which are associated with the positions P, R, N and D of the automatic gear-changing appliance.

The object of the present invention is to simplify the operation of a vehicle equipped with such a selector device while ensuring security against theft.

This object is achieved by the selector device according to the invention, in which the automatic gear-changing appliance of the gearbox is positively retained in the P position when the combined key unit is withdrawn, so that the current supply for electrical consumption units and engagement of the starter are further blocked. On introduction of the combined key unit into the gate of the selector cylinder unit, the gear-changing appliance remains in the P position but the voltage source and the starting motor are unblocked. The vehicle is made ready for operation by rotating the selector cylinder unit into the N position by means of the combined key unit. If the selector slide unit is now pressed forward into the D position by means of the combined key unit, the gear-changing program for the forward gears is activated. The gear-changing appliance is brought into the position for the reverse gear by pressing the selector slide unit rearward into the R position by means of the combined key unit.

Substantial advantages are achieved by the invention. First, ergonomically unambiguous and logical handling is provided for the operation of the lock, ignition and starter. Also, the operational reliability is increased, specifically by ergonomic rational control of forward and rearward travel. Forward motion of the combined key unit is associated with forward travel, and rearward motion of the combined key unit is associated with rearward travel. The security of the parked vehicle is ensured by the parking brake interlock, thus providing increased security against theft in comparison with a conventional steering column lock. The previously usual ignition and steering column lock becomes unnecessary, thus increasing passive safety (knee impact on the ignition and steering column lock). The selector device is also characterized by small dimensions.

Other objects, advantages and novel features of the present invention will become apparent from the following detailed description of the invention when considered in conjunction with the accompanying drawings.

DETAILED DESCRIPTION OF THE DRAWINGS

Figure 4:
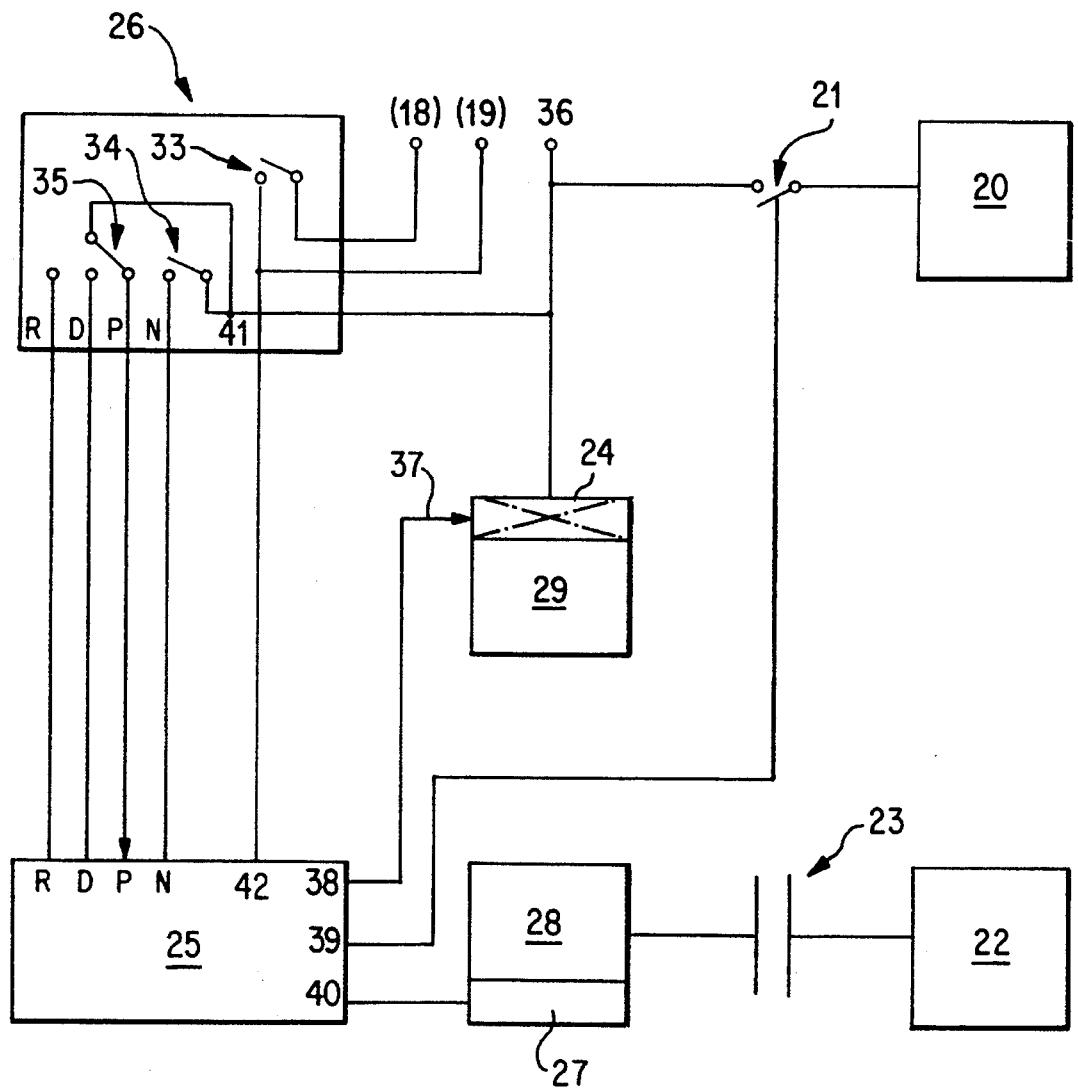
FIG. 4 is a block diagram representing the association between the selector device of FIG. 1 and a motor vehicle, the selector device being in the P position with the combined key unit withdrawn.

Referring first to FIG. 4, a motor vehicle (not shown in detail) has a driving engine/motor 22 which drives an at least two-speed gearbox 28 via a starting element, for example, a hydrodynamic torque converter or a clutch 23. This gearbox 28 is in drive connection at its output end with a propulsion drive, for example, with an axle drive of the motor vehicle.

The gear of the gearbox 28 is changed by an automatic gear-changing appliance 27 whose operation is, in turn, dependent on an electronic control unit 25.

The driving engine/motor 22 can be started, in known manner, by a starting device 20 which works by means of an electric starter motor and which can be switched off or blocked by a starter blocking switch 21, which can be activated by the control unit 25. In known manner, the gearbox output drive of the gearbox 28 can be fixed, so that it cannot rotate relative to the gearbox casing, by means of a parking brake 29 whose actuator 24 is controlled by the electronic control unit 25.

Figure 1:
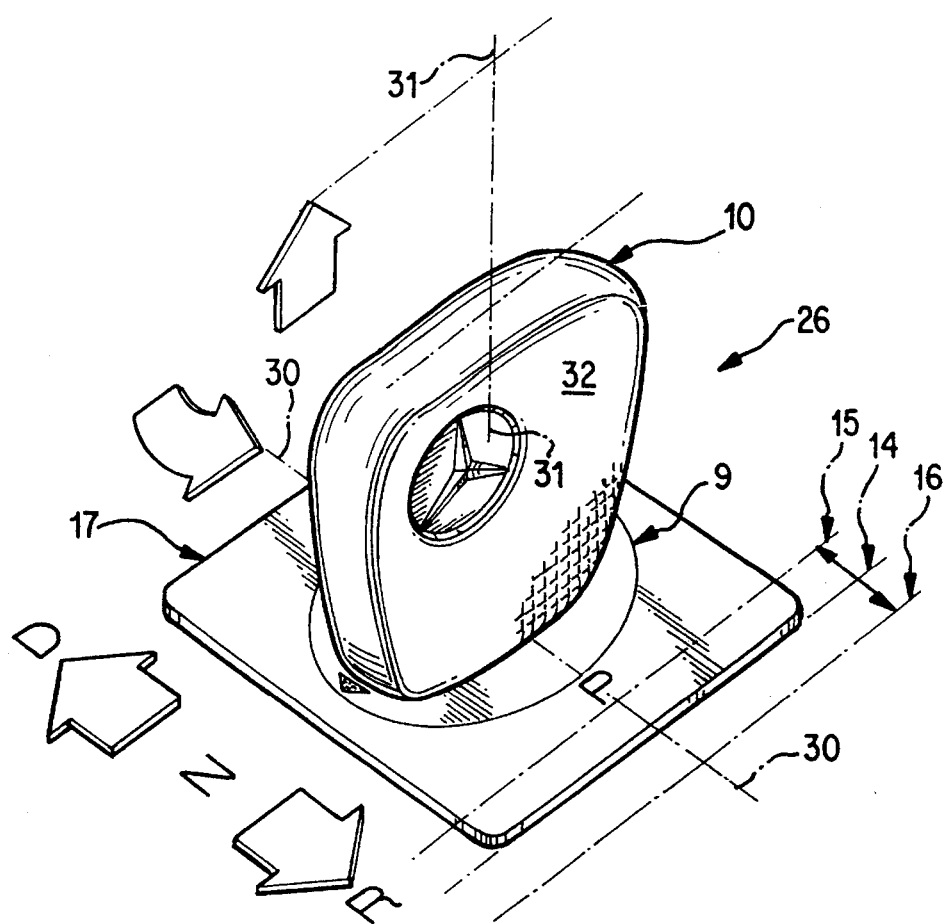
FIG. 1 shows, in a perspective view, a manually actuated part of a selector device according to the invention.
Figure 2:
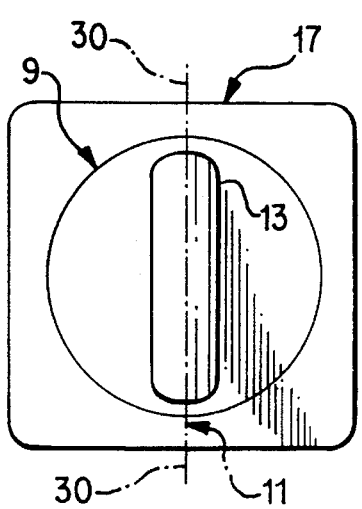
FIG. 2 shows, in the P position, the selector cylinder unit of the selector device of FIG. 1 as an individual part.
Figure 3:
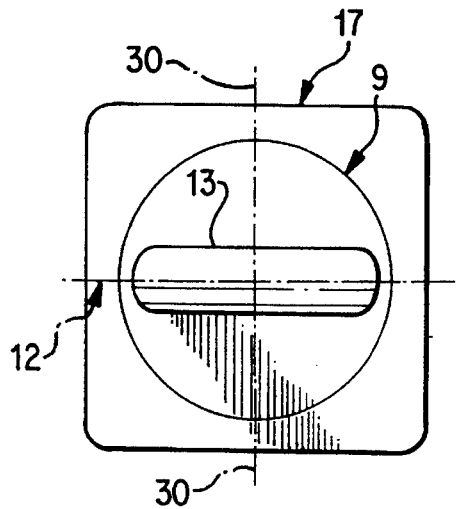
FIG. 3 shows, in the N position, the selector cylinder unit of the selector device of FIG. 1 as an individual part.

Mechanical elements of the selector device 26 which can be actuated by hand are represented diagrammatically in FIGS. 1 to 3 with respect to the features necessary for understanding. In these figures, the selector device 26 has a selector slide unit 17 which can be displaced from a central position 14 in opposed directions of a geometrical main axis 30—30 into end positions 15 or 16, respectively. A selector cylinder unit 9 is accommodated in the selector slide unit 17 and is supported so that it can be rotated to a limited extent relative to the selector slide unit 17 about a geometrical cylinder axis 31—31 at right angles to the main axis 30—30; the selector cylinder unit 9 can take up two defined angular end positions 11 and 12 relative to the selector slide unit 17 and offset by 90° relative to one another (FIGS. 2, 3). The selector cylinder unit 9 has a slot-shaped gate 13 for contacting by a combined key unit 10. The latter, after insertion in the gate 13, has a grip part which remains outside the selector cylinder unit 9 and this grip part is used as a selector actuation element 32 which can be actuated by hand, so that the selector device 26 can be brought into its positions P, R, N and D. For this purpose, an arrangement is adopted for this selector device 26 in which, if the selector slide unit 17 is in its central position 14 and the gate 13 of the selector cylinder unit 9 is in its angular position 11 aligned with the main axis 30—30, the selector device 26 takes up its P position. This is the only position in which the combined key unit 10 can be inserted into the gate 13 or withdrawn from the selector cylinder unit 9.

Referring to FIG. 4, the electrical control part of the selector device 26 has an input (18) for indirect connection of an on-board voltage source, an input (19) for connection of electrical consumption units and an input 36 for connection to the continuous positive pole of the on-board voltage source. The input 36 is also in connection with one contact of the starter blocking switch 21 and with the actuator 24 of the parking brake 29. The selector device 26 has an output 41 which is continuously connected both to its input (19) and to an input 42 of the control unit. The selector device 26 has, furthermore, outputs R, D, P and N which are respectively connected to corresponding inputs R, D, P and N, respectively, of the electronic control unit 25. The latter in turn, has an output 38 connected to the actuator 24 of the parking brake 29, an output 39 connected to the actuator of the starter blocking switch 21 and at least one output 40 connected to the gear-changing appliance 27 of the gearbox 28.

In FIG. 4, the selector device 26 is shown in the P position with the combined key unit 10 withdrawn. In this condition, a switching contact 33 of the selector device, located so as to act between the inputs (18) and (19), and a switching contact 34 of the selector device 26, located so as to act between the input 36 and the output N, of the selector device 26 are interrupted. In the condition shown in FIG. 4, furthermore, a multi-position switching contact 35 of the selector device 26 (which multi-position switching contact 35 is continuously connected to the input 36 and can be switched either to one of the outputs R, D and P of the selector device 26, or can be disconnected from these outputs) is switched to the output P. In consequence, a blocking signal 37 is present at the output 38 of the control unit so that the parking brake 29 is engaged whereas the input (18) for connection of the voltage source to the input (19) for the connection of electrical consumption units is blocked and the starting of the driving engine/motor 22 is impossible because the starter blocking switch 21 is open.

Figure 5:
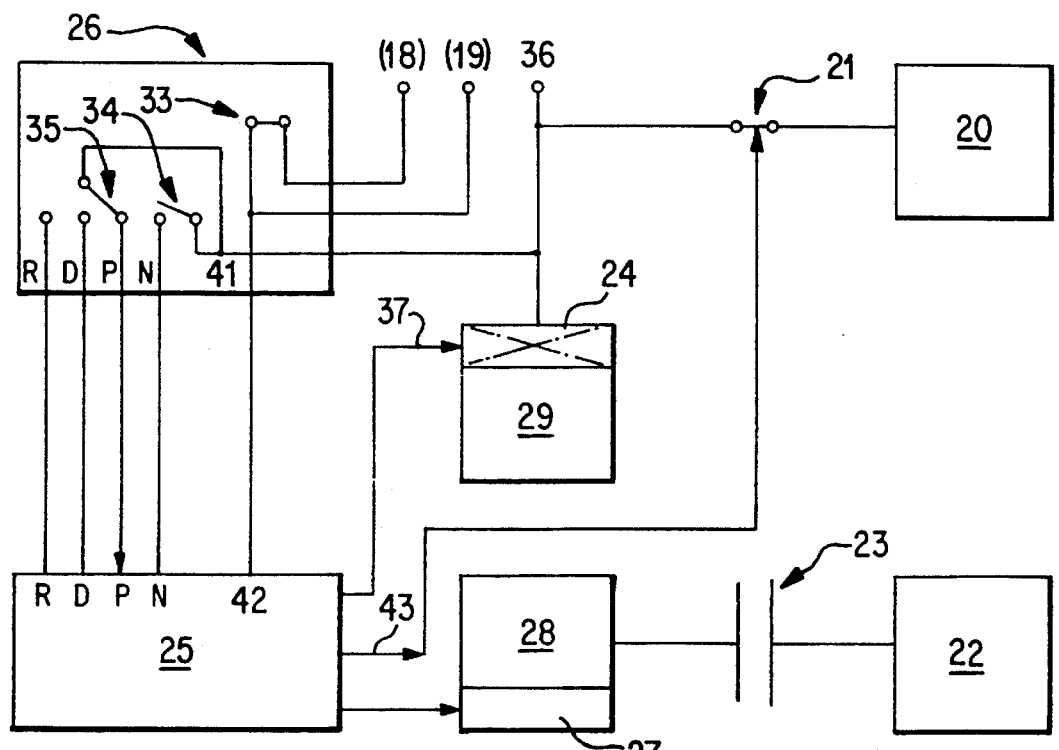
FIG. 5 shows the block diagram of FIG. 4, with the selector device in the P position, and the combined key unit in the position where the key can be withdrawn and in contact with the gate of the selector cylinder unit.

In FIG. 5, the selector device 26 is likewise shown in the P position but with the combined key unit 10 inserted, so that the gate 13 of the selector cylinder unit 9 contacts the combined key unit. 10. In this condition, the switching contact 33 is now closed in the selector device 26 whereas the two other switching contacts 34 and 35 are kept in their positions shown in FIG. 4. In this way, the input (18) is connected for indirect connection of the voltage source to the input (19) for connection of electrical consumption units so that the control unit 25 continues to hold the parking brake 29 in the engaged condition and emits an additional output signal 43 for closing the starter blocking switch 21 so that the electrical consumption units are ready for operation and the driving engine/motor 22 can be started.

Figure 6:
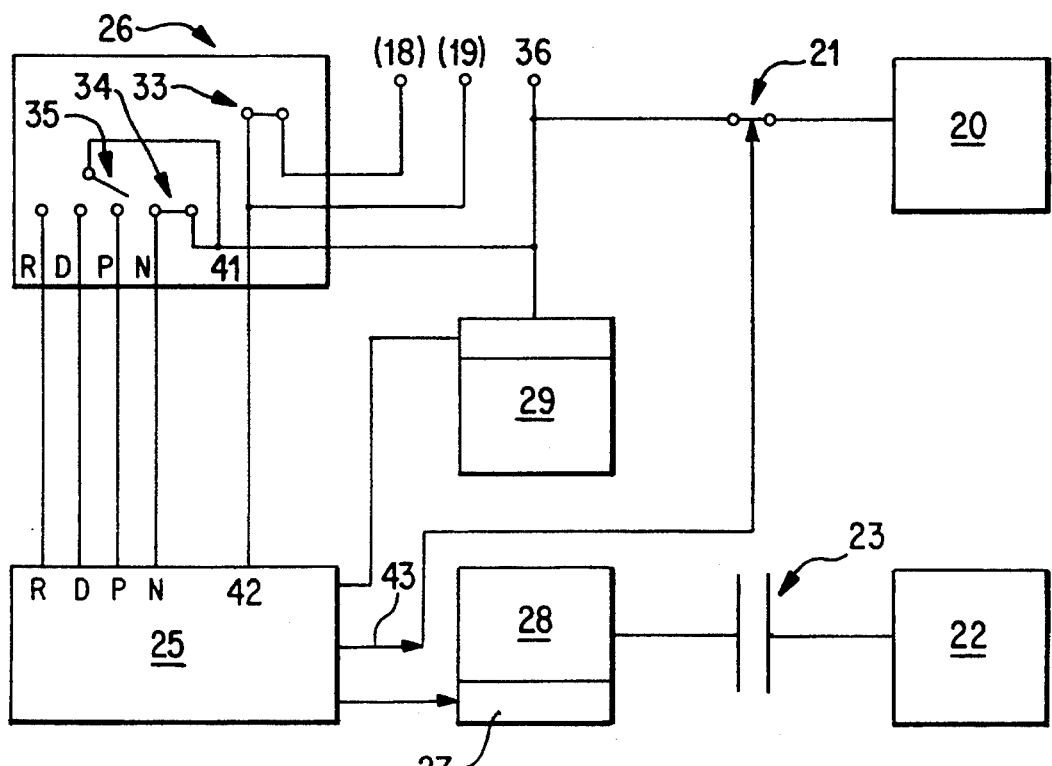
FIG. 6 shows the block diagram of FIG. 4, with the selector device having been actuated into the N position by the combined key unit.

In FIG. 6, the selector device 26 is located in the N position which is attained by rotating the combined key unit 10 by approximately 90° into the position 12 (FIGS. 1 and 3), with the selector slide unit 17 continuing to be located in its central position 14. In this position, the two switching contacts 33 and 34 in the selector unit 26 are closed whereas the outputs R, D and P are disconnected from the input 36 by the multi-position switching contact 35. In this way, the electrical consumption units (input 19) and the starting device 20 continue to be ready for operation whereas the parking brake 29 is now disengaged and the gearbox 28 is brought into a neutral condition, which interrupts torque transmission, by activation of the gear-changing appliance 27 by the control unit 25.

Figure 7:
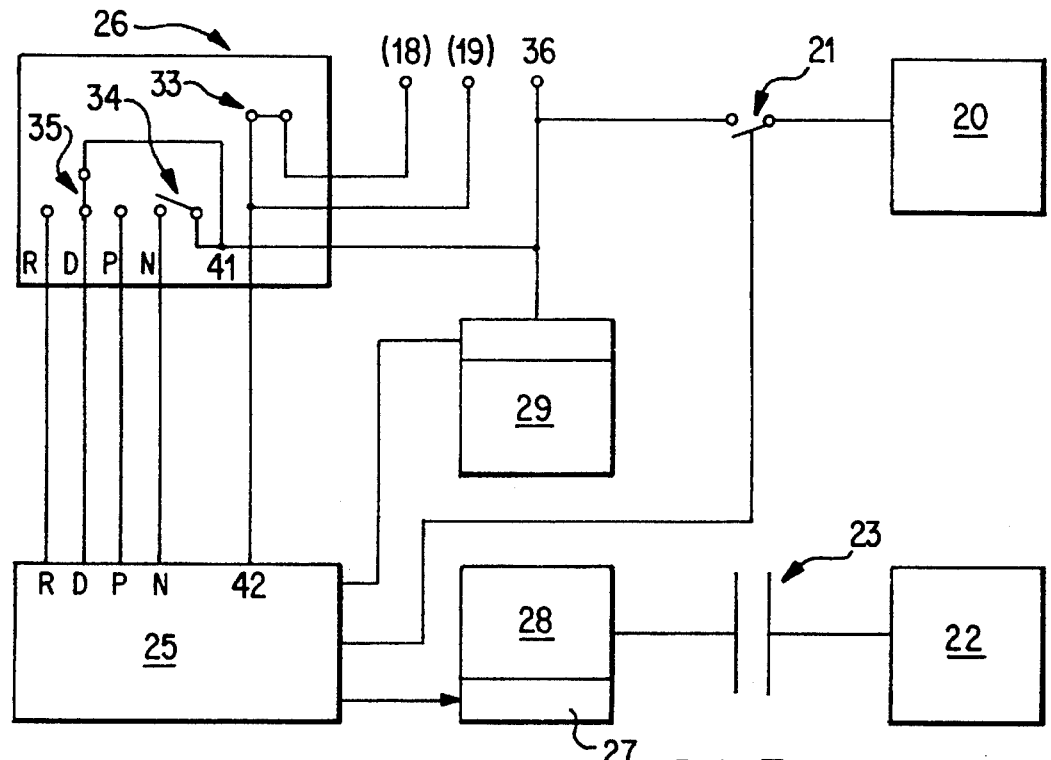
FIG. 7 shows the block diagram of FIG. 4, with the selector device having been actuated into the D position by the combined key unit.

In the D position of the selector device 26 shown in FIG. 7, the switching contact 33 of the selector device 26 continues to be closed, the switching contact 34 is opened and the input 36 is connected to the output D by the multi-position switching contact 35. In consequence, the electrical consumption units (input 19) continue to be ready for operation, the parking brake 29 continues to be disengaged and the starting device 20 is disconnected from its current supply by the open starter blocking switch 21 and, in the control unit 25, the gear-changing program for forward travel or for the forward gears is activated.

Figure 8:
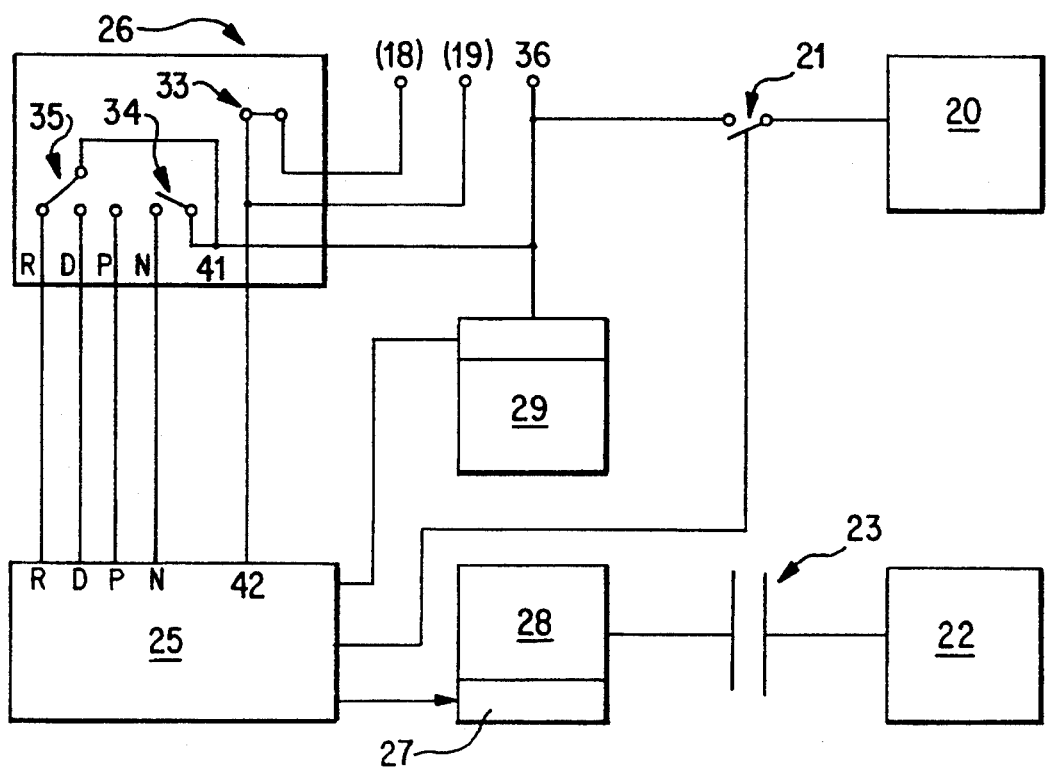
FIG. 8 shows the block diagram of FIG. 4, with the selector device having been actuated into the R position by the combined key unit.

In the R position of the selector device 26 shown in FIG. 8, on the other hand, the switching contact 33 of the selector device 26continues to be closed and the switching contact 34 is opened whereas the input 36 is connected to the output R by the multi-position switching contact 35. In consequence, the electrical consumption units (input 19) continue to be ready for operation, the starter blocking switch 21 is open and the parking brake 29 is disengaged whereas the gearbox 28 now has its gear changed by the gear-changing appliance 27 into reverse gear.

The scope of the invention includes the use of an electric motor for the driving engine/motor 22. The scope of the invention also includes the use of a stepless gear for the gearbox 28. Finally, the invention can also be used in those driving arrangements in which, instead of a special parking brake, one of the drive components of the drive train, for example an electrical driving motor, can be put into a braking condition.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A selector device for automatic gear-changing apparatus of a motor vehicle gear box, said gear-changing apparatus having positions P, R, N and D, and said selector device comprising:

a selector slide unit having a central position and two end positions located oppositely relative to said central position, a first of said end positions corresponding to said D position of said gear-changing apparatus, and a second of said end positions corresponding to said R position of said gear-changing apparatus;

a rotary selector cylinder rotatably accommodated in said selector slide unit, said rotary selector cylinder having two angular positions, a first angular position corresponding to said P position of said gear-changing apparatus, and a second angular position corresponding to said N position of said gear-changing apparatus;

a gate member accommodated on said rotary selector cylinder and adapted to contact with a withdrawable combined key unit;

a withdrawable combined key unit adapted to contact with said gate member, said combined key unit, being manually operable when in contact with said gate member to rotate said rotary selector cylinder between said first and second angular positions, and to displace said selector slide unit between said central position and said end positions; and means for actuating said gear changing appliance to enter said P position when said rotary selector cylinder is in said first angular position; to enter said N position when said rotary selector cylinder is in said second angular position; to enter said D position when said selector slide unit is in said first end position; and to enter said R position when said selector slide unit is in said second end position; wherein said gear-changing apparatus can be driven into the N position only in the central position of the selector slide unit;

the combined key unit can only be withdrawn from the gate member of the selector cylinder unit in the P position on the latter; and an on-board voltage source is blocked relative to electrical consumption units when the combined key unit is withdrawn and is unblocked when the combined key unit makes contact with the gate.

2. Selector device according to claim 1 wherein the combined key unit is withdrawn, an electrical starting motor which can intrinsically be switched on in the P position and in the N position is positively switched off.

* * * * *